United States Patent
Hogasten et al.

(10) Patent No.: US 11,010,878 B2
(45) Date of Patent: May 18, 2021

(54) DYNAMIC RANGE COMPRESSION FOR THERMAL VIDEO

(71) Applicant: FLIR Systems, Inc., Wilsonville, OR (US)

(72) Inventors: Nicholas Hogasten, Goleta, CA (US); Austin A. Richards, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 52 days.

(21) Appl. No.: 16/392,779

(22) Filed: Apr. 24, 2019

(65) Prior Publication Data

US 2019/0251681 A1     Aug. 15, 2019

Related U.S. Application Data (63) Continuation of application No. PCT/US2017/059592, filed on Nov. 1, 2017.
(Continued)

(51) Int. Cl.
*G06T 5/00* (2006.01)
*H04N 5/357* (2011.01)
(Continued)

(52) U.S. Cl.
CPC ............. *G06T 5/009* (2013.01); *G06T 3/40* (2013.01); *G06T 5/50* (2013.01); *H04N 5/33* (2013.01);
(Continued)

(58) Field of Classification Search
CPC .. G06T 5/009; G06T 3/40; G06T 5/50; G06T 2207/10016; G06T 2207/10048;
(Continued)

(56) References Cited

U.S. PATENT DOCUMENTS

| | | | | |
|---|---|---|---|---|
| 6,091,853 A | * | 7/2000 | Otto | ............... G06T 9/005 348/E5.09 |
| 8,515,196 B1 | | 8/2013 | Högasten | |

(Continued)

FOREIGN PATENT DOCUMENTS

| | | |
|---|---|---|
| EP | 1918875 | 5/2008 |
| KR | 2016/0040981 | 4/2016 |

(Continued)

OTHER PUBLICATIONS

Magnus et al., "Temporally Consistent Tone Mapping of Images and Video Using Optimal K-means Clustering", Journal of Mathematical Imaging and Vision, Kluwer Academic Publishers, NL, vol. 57, No. 2, Jul. 21, 2016, pp. 225-238, XP036258806, ISSN: 0924-9907, DOI: 10.1007/S10851-016-067701.

*Primary Examiner* — Utpal D Shah
(74) *Attorney, Agent, or Firm* — Haynes and Boone, LLP (57) ABSTRACT

Various embodiments of the present disclosure may include an imaging system that allows for absolute radiometry of low dynamic range (LDR) radiometric images downsampled from high dynamic range (HDR) radiometric thermal images. The imaging system may capture HDR images. The HDR images may be converted to LDR images by a transfer function. In certain embodiments, a video and/or a stream of HDR images may be captured. A sequence of frames may be defined for at least a plurality of the HDR images. Each of the HDR images of the sequence of frames may be converted to LDR images using the same transfer function.

20 Claims, 7 Drawing Sheets

Related U.S. Application Data (60) Provisional application No. 62/418,028, filed on Nov. 4, 2016.

(51) Int. Cl.
*G06T 3/40* (2006.01)
*G06T 5/50* (2006.01)
*H04N 5/33* (2006.01)
*H04N 5/355* (2011.01)

(52) U.S. Cl.
CPC ......... *H04N 5/355* (2013.01); *H04N 5/35721* (2018.08); *G06T 2207/10016* (2013.01); *G06T 2207/10048* (2013.01); *G06T 2207/20208* (2013.01)

(58) Field of Classification Search
CPC ...... G06T 2207/20208; H04N 5/35721; H04N 5/33; H04N 5/355
See application file for complete search history.

(56) References Cited

U.S. PATENT DOCUMENTS

| | | | | |
|---|---|---|---|---|
| 8,737,736 B2* | 5/2014 | Liu | ........................... | G06T 5/50 382/169 |
| 8,958,658 B1* | 2/2015 | Lim | ........................ | H04N 9/646 382/274 |
| 2005/0104900 A1* | 5/2005 | Toyama | .................. | G06T 5/007 345/629 |
| 2008/0100743 A1* | 5/2008 | Cho | ........................ | G06T 5/007 348/447 |
| 2010/0195901 A1* | 8/2010 | Andrus | .............. | H04N 21/4318 382/162 |
| 2010/0226547 A1* | 9/2010 | Criminisi | ................ | G06T 5/009 382/128 |
| 2012/0170842 A1* | 7/2012 | Liu | ......................... | G06T 5/007 382/167 |
| 2013/0241931 A1* | 9/2013 | Mai | ........................ | G06T 11/60 345/428 |
| 2014/0092012 A1* | 4/2014 | Seshadrinathan | ....... | G06T 5/007 345/157 |
| 2016/0309201 A1* | 10/2016 | Tsukagoshi | .............. | H04N 5/20 |
| 2020/0134792 A1* | 4/2020 | Mandal | .................... | H04N 5/57 |

FOREIGN PATENT DOCUMENTS

WO   WO-2014131755 A1 *   9/2014   ........... H04N 19/147
WO   WO 2018/085447           5/2018

* cited by examiner

DYNAMIC RANGE COMPRESSION FOR THERMAL VIDEO

CROSS-REFERENCE TO RELATED APPLICATIONS

This application is a continuation of International Patent Application No. PCT/US2017/059592 filed Nov. 1, 2017 and entitled "DYNAMIC RANGE COMPRESSION FOR THERMAL VIDEO," which is incorporated herein by reference in its entirety.

International Patent Application No. PCT/US2017/059592 filed Nov. 1, 2017 claims priority to and the benefit of U.S. Provisional Patent Application No. 62/418,028 filed Nov. 4, 2016 and entitled "DYNAMIC RANGE COMPRESSION FOR THERMAL VIDEO" which is hereby incorporated by reference in its entirety.

TECHNICAL FIELD

One or more embodiments of the invention relate generally to imaging and more particularly to, for example, a transfer of high dynamic range (HDR) image data to low dynamic range (LDR) image data.

BACKGROUND

In certain instances, HDR video images may be transferred from a first component to a second component. In certain examples, the video images may be associated with a scene and the HDR video images may be down-sampled to LDR video images for display by the second component.

SUMMARY

Systems and methods are disclosed herein for converting HDR image frames to LDR image frames. In certain embodiments, a method may be provided and may include defining a sequence of frames including a plurality of high dynamic range (HDR) image frames, where each HDR image frame comprises a plurality of pixels and each pixel is associated with a HDR infrared image value, determining a transfer function for the sequence of frames, where the transfer function associates at least a portion of the HDR infrared image values with LDR image values, receiving image data including the HDR image frames defined in the sequence of frames, and converting, with the transfer function, each of the HDR image frames to a low dynamic range (LDR) image frame.

In certain other embodiments, a system may be provided. The system may include a logic device associated with a camera. The logic device may be configured to define a sequence of frames including a plurality of high dynamic range (HDR) image frames, where each HDR image frame comprises a plurality of pixels and each pixel is associated with a HDR infrared image value, determine a transfer function for the sequence of frames, where the transfer function associates at least a portion of the HDR infrared image values with LDR image values, receive image data including the HDR image frames defined in the sequence of frames, and convert, with the transfer function, each of the HDR image frames to a low dynamic range (LDR) image frame.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided in accordance with one or more embodiments to convert high dynamic range (HDR) video images to low dynamic range (LDR) video images. Certain embodiments may convert HDR video images to LDR video images using a transfer function.

In certain applications, absolute radiometry (e.g., the ability to compare the irradiance of each pixel from frame to frame) may be important. In such applications, data from frame to frame may be compared and, thus, objects within each frame may be identified according to radiometry and/or thermal data. Such applications may, for example, compare the position of the object from frame to frame according to the radiometry and/or thermal data. As such, in certain embodiments, a sequence of frames may be defined before, during, and/or after the HDR video images are captured. In certain such embodiments, for each sequence of frames, the transfer function may be constant. That is, the same transfer function may be used to convert each frame within the sequence of frames of the HDR video to LDR frames. The transfer function may be determined before, during, and/or after the HDR video images are captured. The images may be, for example, radiometric thermal images such as infrared or other thermal images. The video may include a plurality of such images (e.g., each frame of the video may be a thermal image).

Figure 1:
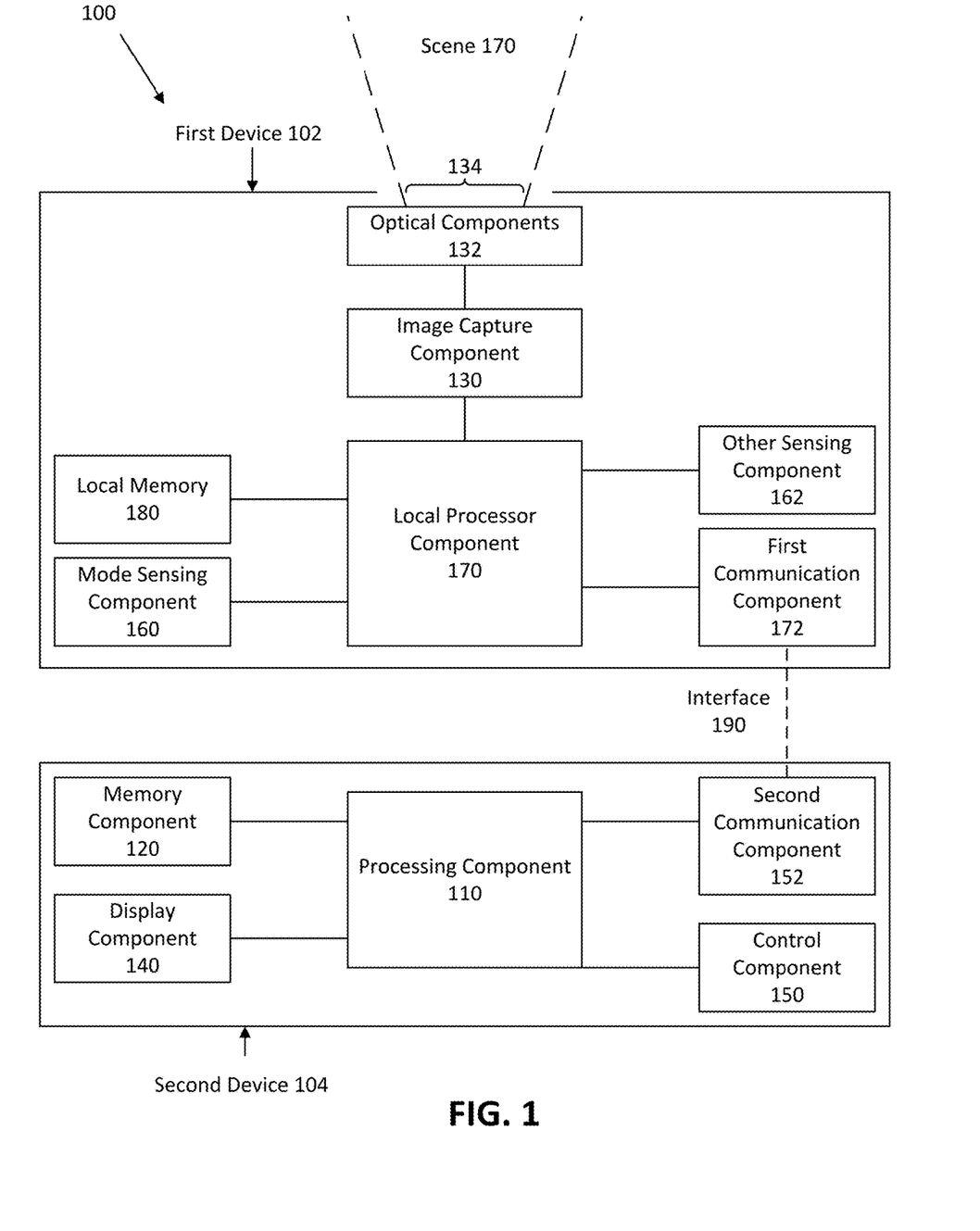
FIG. 1 illustrates a block diagram of an imaging system in accordance with an embodiment of the disclosure.

FIG. 1 illustrates a block diagram of an imaging system in accordance with an embodiment of the disclosure. Imaging system 100 in FIG. 1 may be used to capture and process image frames in accordance with various techniques described herein.

Imaging system 100 includes components distributed over multiple devices. In particular, imaging system 100 includes a first device 102 (a transmitting device) and a second device 104 (a receiving device) in communication with the first device 102. Other embodiments may distribute the components to devices in other ways and may, in addition, distribute the components to three or more devices. Some such embodiments may distribute one, some, or all of the components of imaging system 100 over the cloud. Thus, in those embodiments, image processing may be performed over the cloud, using one or multiple cloud devices, by sending image data over the cloud. Once the image has been processed, the image may be displayed or stored via an internet service (such as on YouTube®, Dropbox®, Google Drive®, etc.) or sent back to a user device and displayed or stored on the user device. In various embodiments, either the first device 102 and/or the second device 104 may be a camera, a camera suite, a sensor suite, a smartphone, a computer, a server, a tablet, or another type of electronic device.

In certain embodiments, the first device 102 and the second device 104 may be coupled together. That is, the first device 102 may be a camera attachment that may be fitted or communicatively connected (e.g., via Bluetooth) to the second device 104. The second device 104 may run an application that performs at least a portion of an image processing procedure. In such an embodiment, the second device 104 may be a smartphone, a tablet, a computer, or another type of electronic device that may receive the camera attachment. In certain embodiments, the camera attachment may be fitted via connectors such as USB or Lightning Cable connectors. Other embodiments may connect the first device 102 and the second device 104 through a network connection, such as via Bluetooth, the internet, Near Field Communications ("NFC"), Local Area Network ("LAN"), or other network connections.

In one embodiment, the first device 102 includes a local processor component 170, a local memory 180, an image capture component 130, optical components 132 (e.g., one or more lenses configured to receive electromagnetic radiation through an aperture 134 in housing 101 and pass the electromagnetic radiation to image capture component 130), a first communication component 172, a mode sensing component 160, and an other sensing component 162. The second device 104 may include a processing component 110, a memory component 120, a display component 140, a second communication component 152, and a control component 150.

In various embodiments, the first device 102 may be implemented as an imaging device, such as a camera, to capture image frames of, for example, a scene 170 (e.g., a field of view). The first device 102 may represent any type of camera which, for example, detects electromagnetic radiation (e.g., irradiance) and provides representative data (e.g., one or more still image frames or video image frames). For example, the first device 102 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, a traffic camera, and/or other locations) via one or more types of mounts. In still another example, the first device 102 may be integrated as part of a non-mobile installation to provide image frames to be stored and/or displayed.

The local processor component 170 and/or the processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. The local processor component 170 may be adapted to interface and communicate with components 130, 160, 162, 172, and 180 to perform method and processing steps as described herein. The processing component 110 may be adapted to interface and communicate with components 120, 140, 150, and 152.

Additionally, the local processor component 170 may be adapted to receive image signals from image capture component 130, process image signals (e.g., to provide processed image data), store image signals or image data in local memory 180, and/or retrieve stored image signals from local memory 180. Certain embodiments of the first device 102 may include a plurality of image capture components. Such embodiments may capture multiple scenes and the local processor component 170 and/or the processing component 110 may then create a composite image out of the multiple scenes captured by the plurality of image capture components. The local processor component 170 may also communicate data, via the device communication component 172, to the second device 104. The device communication component 172 may communicate with the second device 104 via an interface 190 established between the device communication component 172 and a communication component 152 of the first device 102. In various embodiments, the interface 190 may be a Bluetooth link, a WiFi link, a NFC link, a wired connection, or another type of link between the first device 102 and the second device 104. In certain embodiments, the interface 190 may be a low bitrate interface. For the purposes of this disclosure, a "low bitrate interface" may be any interface that would not transfer data at a high enough rate to allow smooth real-time showing or streaming on a receiving device. Accordingly, as video definitions increase, the speed of what is considered a "low bitrate interface" may increase as well. Additionally, certain such interfaces may be limited in the amount of dynamic range that the interfaces can transfer due to the interfaces themselves or software used to process videos. For example, certain commercially available video encoders, video compressors, and display drivers may require frames to have only 8 or 10 bits of dynamic range (for example, 8 bits of luminance dynamic range). As the software used to process the videos are part of the process of transferring the video data, such software may also be considered as part of the "low bitrate interface". Certain hardware components such as the physical interfaces may also be limited to a maximum number of bits per sample. For example, parallel data interfaces may only have 8 pins on a connector of there may be 10 input pins on a serializer (parallel to serial converter).

In other embodiments, the interface 190 may have available bandwidth that may allow the first device 102 to communicate images or video to the second device 104 in high dynamic range. However, in such embodiments, low bitrate communication may still be desirable as transferring via low bitrate may allow additional devices to share the interface 190.

The local memory 180 and/or the memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 and/or the local processor component 170 is adapted to execute software stored in the memory component 120 and/or the local memory 180, respectively, to perform various methods, processes, and modes of operations in manner as described herein.

Image capture component 130 includes, in one embodiment, one or more sensors (e.g., any type visible light, infrared, or other type of detector, including a detector implemented as part of a focal plane array) for capturing image signals representative of an image, of scene 170. In one embodiment, the sensors of image capture component 130 (e.g., an infrared sensor) provide for representing (e.g., converting) a captured thermal or radiometric image signal of scene 170 as digital data (e.g., via an analog-to-digital converter included as part of the sensor or separate from the sensor as part of imaging system 100). The image capture component 130 may capture high dynamic range radiometric thermal images or videos.

The local processor component 170 or the processing component 110 (via the interface 190) may be adapted to receive image signals from the image capture component 130, process image signals (e.g., to provide processed image data), store image signals or image data in the local memory 180 or the memory component 120, and/or retrieve stored image signals from the respective memories. Image data, either high dynamic range image data or low dynamic range image data, may be transferred between the first device 102 and the second device 104 between the interface 190. In certain embodiments, the image data transferred may be compressed image data. Processing component 110 may be adapted to process image signals received to provide image data (e.g., reconstructed image data) to the display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140 that the processing component 110 retrieved from the memory component 120, processed from image data received via the interface 190, or processed from any other source. Display component 140 may include display electronics, which may be utilized by processing component 110 to display image data and information. Display component 140 may receive image data and information directly from image capture component 130 via the interface 190, from the local processor component 170 via the interface 190, or the image data and information may be transferred from memory component 120.

In various aspects, display component 140 may be remotely positioned (e.g., housed in a separate housing) from the image capture component 130, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

In certain embodiments, the first device 102 may include the control component 150 and/or the display component 140 instead of or in addition to the second device 104. It is appreciated that the various components described herein may be included on either or both of the first device 102 and the second device 104.

Mode sensing component 160 includes, in one embodiment, an application sensor adapted to automatically sense a mode of operation, depending on the sensed application (e.g., intended use or implementation), and provide related information to the local processor component 170 and/or the processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electro-magnetic triggering mechanism, or some combination thereof. For example, for one or more embodiments, mode sensing component 160 senses a mode of operation corresponding to the imaging system 100's intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore, in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof or a structure or part thereof and may include a sensor adapted to provide a sensing signal to processing component 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or additionally, as discussed herein for one or more embodiments, a user may provide a user input via control component 150 (e.g., a wireless touch screen of display component 140) to designate the desired mode (e.g., application) of imaging system 100.

Processing component 110 and/or local processor component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100). In certain embodiments, a component may communicate with another component via the interface 190.

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure or traffic camera). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 162 may include one or more conventional sensors as would be known by those skilled in the art for monitoring various conditions (e.g., environmental conditions) that may have an effect (e.g., on the image appearance) on the data provided by image capture component 130. The other sensing components 162 may be located on the first device 102, as shown in FIG. 1, on the second device 104, on both the first device 102 and the second device 104, or, alternatively or additionally, on another device separate from the first device 102 and the second device 104.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 and/or device communication component 172 may be implemented as a network interface component (NIC) adapted for communication with a network including other devices in the network. In various embodiments, communication component 152 and/or device communication component 172 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 and/or device communication component 172 may include an antenna coupled thereto for wireless communication purposes. In other embodiments, the communication component 152 and/or device communication component 172 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network. The communication component 172 communication component 152 may send radiometric thermal images or video over the interface 190 to the communication component 152.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 2:
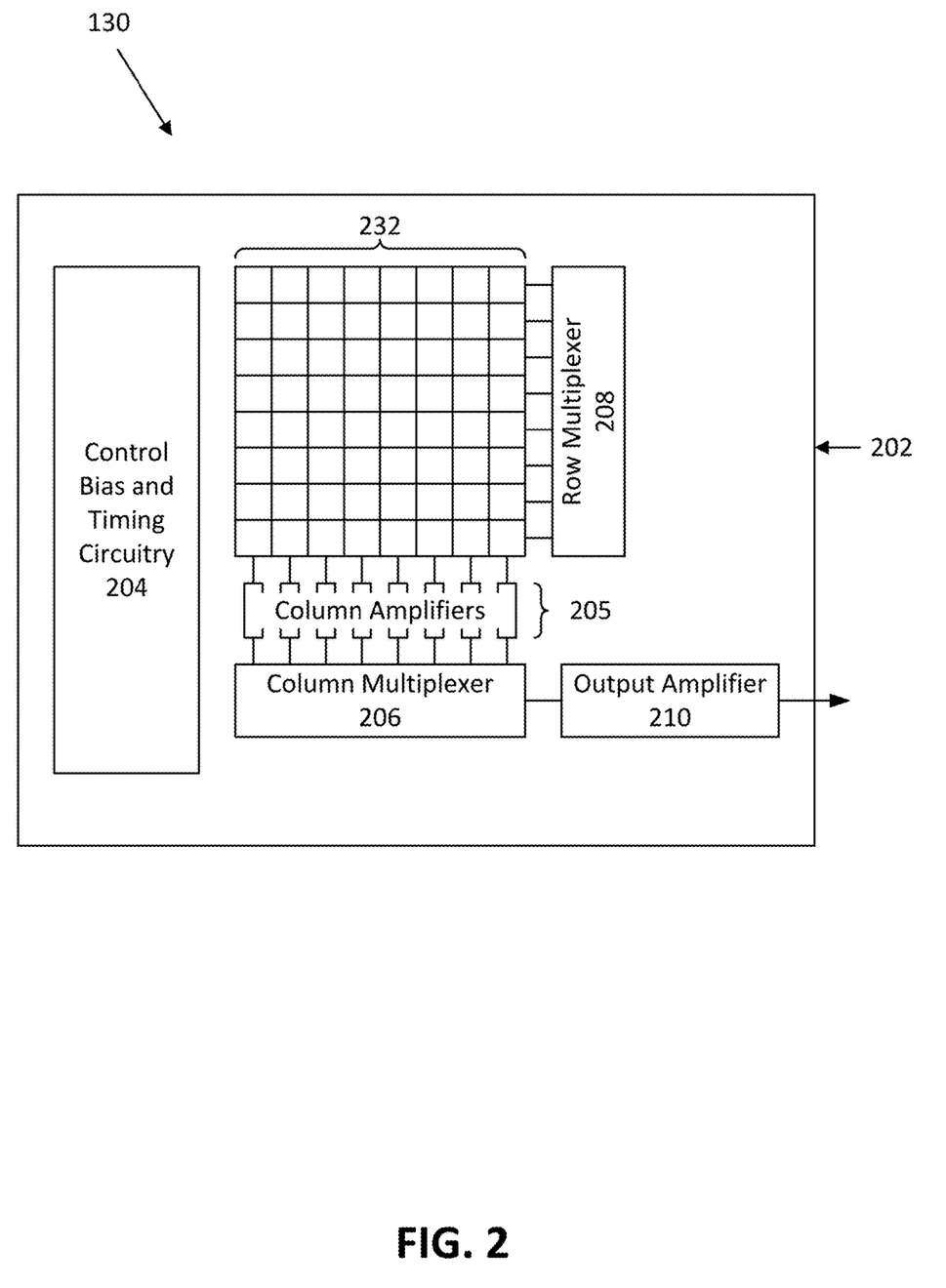
FIG. 2 illustrates a block diagram of an example image capture component in accordance with an embodiment of the disclosure.

FIG. 2 illustrates a block diagram of example image capture component 130 in accordance with an embodiment of the disclosure. In this illustrated embodiment, image capture component 130 is a focal plane array (FPA) including an array of unit cells 232 and a read out integrated circuit (ROIC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 to ROIC 202.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to processing component 110 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
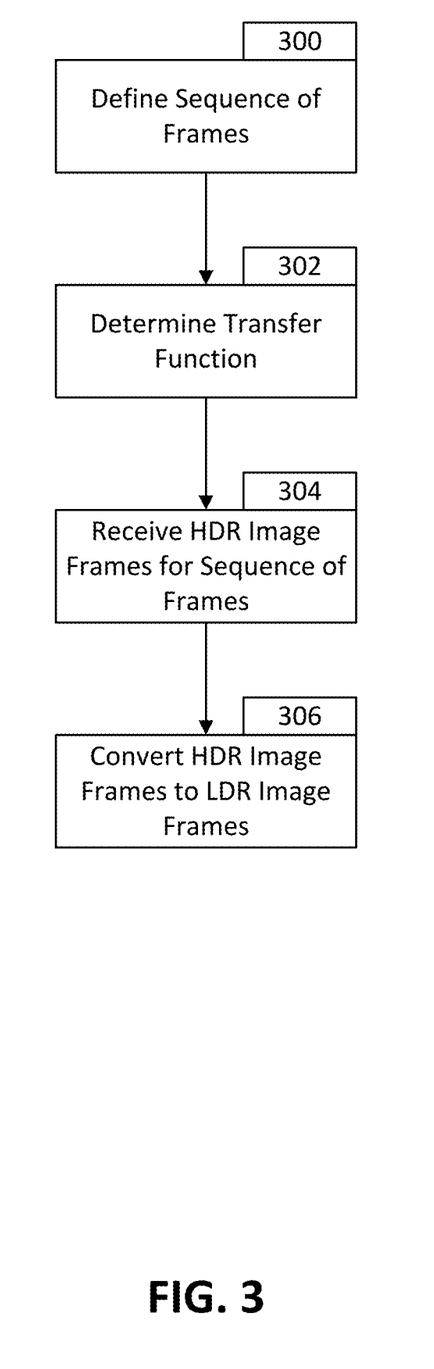
FIG. 3 illustrates a flowchart of a process of converting high dynamic range images to low dynamic range images in accordance with an embodiment of the disclosure.

FIG. 3 illustrates a flowchart of a process of converting high dynamic range images to low dynamic range images in accordance with an embodiment of the disclosure. In block 300, a sequence of frames may be defined for images (e.g., a plurality of still images and/or video images) captured and/or to be captured by an imaging device. The imaging device may capture the images in a high dynamic range (HDR) range. Such HDR images may be a radiometric image (e.g., an image measuring electromagnetic radiation, such as a thermal image) though HDR images of other embodiments may be visual images. For thermal HDR images, the image value or pixel value of a pixel within the HDR image may reflect a temperature of a portion of the scene represented by the pixel. In such an embodiment, pixels imaging warmer portions of the scene may have higher signal values while pixels imaging cooler portions of the image may have lower signal values.

The HDR image may, in certain embodiments, be an image with a high amount of dynamic range. For example, the HDR image may include 8 bits, 12, bits, 14 bits, 16 bits, 18 bits, 24 bits, or higher than 24 bits of range.

In block 302, a transfer function may be determined. The transfer function may associate at least a plurality of HDR image values to LDR image values. The transfer function may map or associate each HDR image value to a LDR image value. In certain embodiments, the transfer function may be used to down-sample a HDR image to a LDR image, a sequence of HDR images to a sequence of LDR images, and/or HDR video to LDR video (which may include a plurality of individual images and/or frames). Each of the resulting down-sampled LDR images may be an image with a dynamic range lower than the corresponding HDR image. That is, if a certain embodiment has an HDR image with a dynamic range of 16 bits, the LDR image may be an image with a dynamic range of 12 bits, 8 bits, 6 bits, 5 bit, 4 bits, or any other dynamic range less than 16 bits. If the HDR image has a higher dynamic range, the LDR image may accordingly also have a higher dynamic range, though the LDR image's dynamic range may still be lower than the HDR image's dynamic range.

As the HDR image has a higher dynamic range than the LDR image, in certain instances, signals present in the HDR image may utilize a higher amount of image values than the total amount of image values available for the LDR image. For example, a 12 bit image may include 4,096 unique signal values (e.g., pixel values) while an 8 bit image can include only 256 unique signal values. As such, the HDR image may utilize more than 256 image values and, thus, in an LDR representation of the original HDR image, multiple unique HDR values will be represented by the same, single, LDR image value. In some such applications, representing multiple HDR values with a single LDR image value may lead to an undesirable loss of information.

The transfer function may map or associate the HDR image values to the LDR image values through various techniques. For example, in a certain embodiment, the amount of unique HDR image values used in the HDR image may first be determined. If the number of LDR image values available is higher than the amount of unique HDR image values used in the HDR image, then the transfer function may map each unique HDR image value used in the HDR image to a unique LDR image value in a piecewise linear function. In certain such embodiments, the transfer function may map the HDR image values to a set sequence of LDR image values (e.g., if there are 60 unique HDR image values, it may map the unique HDR image values to pixel values of 120 to 180 for a 8 bit LDR image), but other embodiments may first determine the relative relationships between the unique HDR image values and try to preserve such relative relationships, when possible, when mapping the HDR image values to corresponding LDR image values (e.g., if an HDR image uses image values at two tail ends of a distribution of possible HDR image values, the corresponding LDR image values used may also be distributed at the tail ends of the possible image value distribution). In such instances, the piecewise linear function may be a one-to-one function. Additionally, a non-linear, monotonically increasing, transfer function may be used such that the lowest LDR image value used is the lowest possible LDR image value and the highest LDR image value used is the highest possible LDR image value. One possible method to create such a HDR to LDR transfer function is histogram equalization.

In other embodiments, differences between image values may be maximized to better show temperature differences and/or image contrast within the image. In such embodiments, the transfer function may be created such that the full range of possible LDR image values are used (e.g., at least one LDR pixel has an image value of the lowest possible value and at least one LDR pixel has an image value of the highest possible value).

The HDR image values may also be associated to LDR image values through other techniques. Another example may be applicable for situations where the amount of unique HDR image values may exceed the amount of available LDR image values. In such a situation, the previous example of one-to-one linear piecewise mapping of HDR image values to LDR image values may not be possible. As such, the HDR image values of the HDR image may be mapped to the LDR image values through, for example, a linear compression or histogram equalization where HDR image values of increasing value are mapped to increasing LDR image values.

In one example, the HDR image values may be associated to LDR image values on a linear basis. That is, the mapping of HDR to LDR image values may be linear. In other words, if there are 256 available LDR image values and there are 512 unique HDR image values, two HDR image values may be matched to one LDR image value. In such an example, the two lowest HDR image values may be matched to the lowest LDR image value, the next two lowest HDR image values may be matched to the next lowest LDR image value, and so on. In certain such examples, the number of HDR image values may not exactly match up with the number of LDR image values (e.g., there may be 2.5 unique HDR image values for every available LDR image value). For those examples, there may be alternating sequences where one LDR image value is assigned an additional HDR image value. Associating HDR image values to LDR image values on a linear basis may be further described in FIG. 7A.

Another technique of mapping HDR image values to LDR image values may be histogram equalization. In such a technique, the slope of the HDR to LDR transfer function may be proportional to the amplitude of the histogram for the corresponding HDR image value.

Also, the mapping of HDR image values to LDR image values may be fully or partially governed by other logic. For example, the LDR image value gain may be limited such that an increase of one count of the HDR image value may correspond to no more than an increase of one count of the LDR image value. Other embodiments may limit the maximum slope of the transfer to other values different from one depending on, for example, the maximum needed signal fidelity on the receiving side.

The mapping of HDR image values to LDR image values of the transfer function may be performed according to a HDR to LDR compression. The HDR to LDR compression may determine the number of HDR counts associated with each LDR count. Accordingly, the lower the HDR to LDR compression, the lower the amount of HDR values associated with each LDR count. In some images, the transfer function may map all HDR image values of the image to LDR image values according to a single HDR to LDR compression. In other images, the HDR to LDR compression may be different for different ranges of HDR image values. Other images may associate different HDR to LDR compression for each LDR image value. In certain embodiments, a center and/or point of interest within the image may be detected and image values within the range of the image values in the center and/or the point of interest may have a lower HDR to LDR compression. Accordingly, each count of LDR gain may correspond to a smaller amount of HDR gain within the center and/or the point of view than elsewhere within the image (e.g., within the center of the image, a smaller amount of HDR image values may be mapped to each LDR image value).

In certain such embodiments, the center of the image may be determined to be a point of interest, as images are sometimes centered on the point of interest. In other embodiments, a point of interest or multiple points of interest may be detected within the image. In certain such embodiments, the point of interest may be detected thermal values that are close to values typical for human temperature and/or irradiance levels. Additionally, the thermal values that are close to the values typical for human temperature and/or irradiance levels may have a lower HDR to LDR compression.

In one embodiment, the transfer function may be created as a scaled cumulative sum of vector values. Each vector index represents an HDR image value or a continuous range of HDR image values. The value/amplitude at each vector index is the sum of some metric, for all pixels of a specific HDR value or range of values. If the metric is a simple existence metric, i.e. metric is always '1', the vector becomes a histogram of pixel intensities. In an application where a user defines a set of interest points, the metric could be inversely proportional to the Euclidian distance from nearest interest points such that vector indices representing HDR values that are common near the points of interest will have higher values/amplitude than vector indices representing values that are not common near the points of interest. Additionally, the point of interest can be defined in the irradiance space instead of in the image space. For example, the point of interest could be defined as a specific HDR value range understood to be close to values common when imaging human subjects. The metric can be inversely proportional to the difference in signal value relative to the point of interest (e.g., signal value of interest). Other metrics can be used to determine the vector values as can be understood by someone skilled in the art.

In certain embodiments, the transfer function created in block 302 may be used for the sequence of frames. For example, certain applications may benefit from absolute radiometry. Such applications may include, for example, applications where the scene is analyzed (e.g., a red light camera, a security camera, and/or other such applications), applications where one scene is continuously imaged, and/or other applications where frame to frame consistency is useful. In such applications benefiting from absolute radiometry, the same transfer function may be used for all frames within the sequence of frames to allow for consistency from frame to frame (e.g., each pixel value may correspond to the same temperature and/or range of temperatures throughout the sequence of frames).

In block 304, the HDR image frames for the sequence of frames may be received. In certain embodiments, the HDR image frames may be received by a processing device from a capturing device (e.g., a red light traffic camera). Such embodiments may receive the HDR image frames through a wired and/or wireless data connection. Other embodiments may combine the processing device and the image capturing device within one device.

The HDR image may be received from an image capture component, such as the image capture component 130 by, for example, the image capture component 130 capturing a scene and outputting the image of the scene as HDR image data and may include a plurality of pixels depicting the scene. The HDR image may be received by a processing device (e.g., a controller), such as the local processor component 170. Certain embodiments may receive multiple HDR images from multiple image capture components. In such embodiments, multiple HDR to LDR image conversions may be performed by the local processor component 170.

In block 306, the HDR image frames may be converted to LDR image frames using the transfer function. In certain embodiments, each HDR image frame may be converted to a LDR image frame upon the processing device receiving the HDR image frame, but other embodiments may receive all HDR image frames before converting the HDR image frames to LDR image frames.

Additionally, before and/or after converting the HDR image frames to LDR image frames, the image (either HDR and/or LDR) may be filtered. A filter may be applied to the image to remove noise, preserve or enhance edges within the image, or filter the image in another way. The filtering of the image may be varied depending on the position of the image. That is, certain portions of the image (such as the center, the edges, or a position of interest such as a heat source) may be filtered differently (for example, with a different set of filter parameters) than other portions of the image. In certain embodiments, the image filtering may be skipped or forgone. In embodiments where multiple images are received, filtering may be performed on one, some, or all of the images received.

Figure 4:
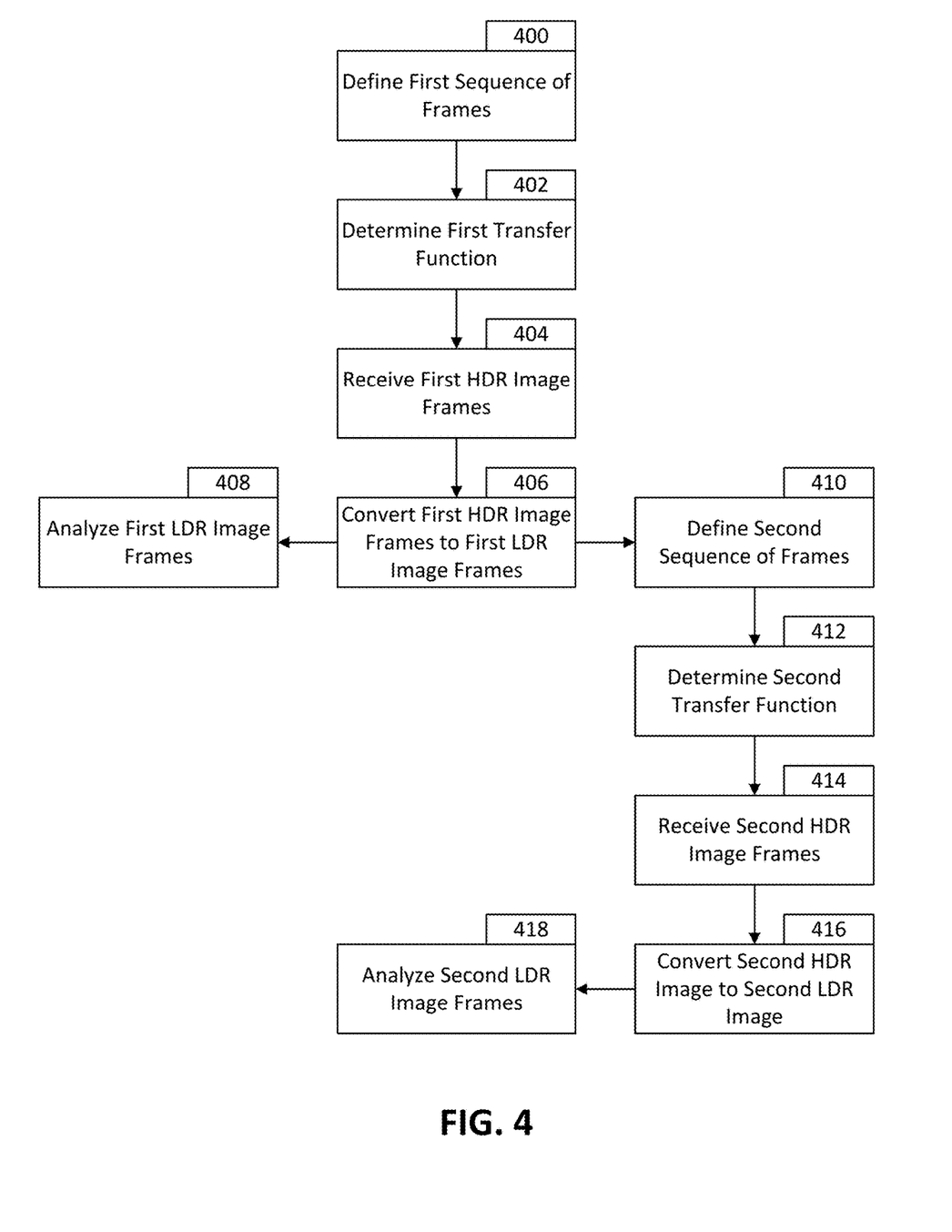
FIG. 4 illustrates a flowchart of a further process of converting high dynamic range images to low dynamic range images in accordance with an embodiment of the disclosure.

FIG. 4 illustrates a flowchart of a further process of converting high dynamic range images to low dynamic range images in accordance with an embodiment of the disclosure. FIG. 4 may illustrate a process where a plurality of sequences of frames are defined. Such processes may be used in, for example, video imaging of a plurality of separate stages where absolute radiometry is important within each of the stages, but not as important between the stages. Such examples may include, for example, red light traffic camera monitoring including multiple red light cycles, security camera monitoring during different periods of a day, and/or other such situations where absolute radiometry is important within certain stages, but not between stages.

In block 400, a first sequence of frames may be defined. The first sequence of frames may be defined in a manner similar to that described in block 300. In block 402, a first transfer function may be determined. The first transfer function may be associated with the first sequence of frames and may, for example, be used to down-sample (or up-sample) all images in the first sequence of frames.

In block 404, the HDR image frames of the first sequence of frames may be captured and/or received. Block 404 may be performed similar to block 304 of FIG. 3. In block 406, the HDR image frames of the first sequence of frames may be converted to LDR image frames. Block 406 may be performed similar to block 306 of FIG. 3.

After the HDR image frames have been converted to LDR image frames, the LDR image frames may be analyzed in block 408. For example, the LDR image frames may be analyzed to determine whether a vehicle has ran a red light, whether there are suspicious objects and/or personnel within an area, and/or whether there are other abnormal situations. In certain such examples, the absolute radiometry of the LDR image frames (e.g., each pixel value may be consistently associated with a temperature from frame to frame within the first sequence of frames) may aid in the analysis of the frames.

In block 410, a second sequence of frames may be defined. The second sequence of frames may be distinct from the first sequence of frames. In certain embodiments, the second sequence of frames may be a sequence of frames imaged during a motion cycle later than the motion cycle that the first sequence of frames was imaged. For example, the first sequence of frames may be a sequence of frames shot during a first red light sequence (e.g., during a first continuous period when a traffic light is red) and the second sequence of frames may be a sequence of frames shot during a second red light period (e.g., after the traffic light has turned green, yellow, and then back to red after the first sequence of frames). In certain other examples, a red light camera may be configured to rotate between different parts of the intersection (e.g., it may rotate to image different portions of the intersection depending on which portion of the intersection is being shown a red light) and the first motion cycle may be a first dwell point (e.g., when a first portion of the intersection is being imaged) and the second motion cycle may be a second dwell point (e.g., when a second portion of the intersection is being imaged). In such an example, the red light camera may be configured to move between, at least, the first and second dwell points (e.g., the first and second dwell points may be two different parts of the intersection and the camera may move between the first and second dwell points responsive to which intersection's light is currently red).

In block 412, a second transfer function may be defined for the second sequence of frames. In certain examples, the second transfer function may be different from the first transfer function. In certain embodiments, the second transfer function may be an adjusted transfer function that may be adjusted responsive to detected environmental conditions (e.g., determining that the environment has heated up), due to objects within the scene (e.g., a higher temperature object may be imaged during the second sequence of frames), due to a change of angles, and/or due to other factors.

For example, a controller may determine that, during the first motion cycle, the first transfer function may include one or more HDR image values unassociated with LDR image values, or may determine that certain LDR image values are associated with too many HDR image values. As such, the first transfer function may be adjusted accordingly to include the unassociated HDR image values and/or arrive at a more event distribution of HDR to LDR image values. Additionally, the controller may detect an object within the first sequence of frames that was not previously detected. The object may be, for example, a vehicle, a person, an animal, or another object (e.g., another heat source). The second transfer function may be changed such that the HDR image values associated with the object may be associated with LDR image values.

In certain embodiments, the first and/or second transfer functions may be generated responsive to, for example, the scene imaged in the first and/or second sequence of frames, to detected environmental conditions, to objects imaged, to a time of day, and/or to certain automatic and/or user inputted settings. In other embodiments, the first and/or second transfer functions may be pre-determined transfer functions. In such embodiments, the controller may, for example, responsive to detecting objects within the scene, detecting environmental conditions, determining a time of day, detecting settings, and/or responsive to other factors, select one or more (e.g., one transfer function for a portion of the scene and another transfer function for another portion of the scene) of the pre-determined transfer functions as the first transfer function and/or the second transfer function.

In block 414, HDR image frames of the second sequence of frames may be received. The HDR image frames of the second sequence of frames may be converted to LDR image frames in block 416. The LDR image frames of the second sequence of frames may be analyzed in block 418. Blocks 414-418 may be similar to blocks 404-408.

FIGS. 5A-F illustrate an example of a scene imaged by a high dynamic range imaging device and converted to low dynamic range in accordance with an embodiment of the disclosure. FIGS. 5A-F may illustrate two traffic signal sequences. A camera may be used to image the intersection to, for example, detect any vehicle that runs a red light.

Figure 5A:
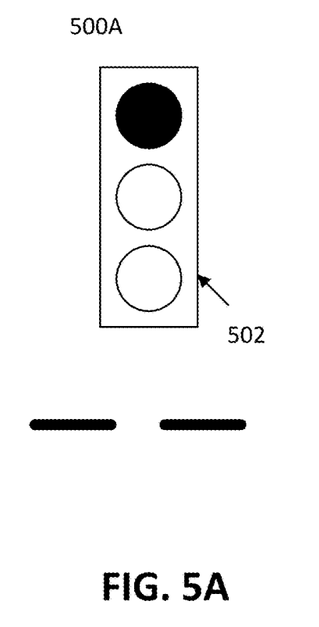
FIGS. 5A-F illustrate an example of a scene imaged by a high dynamic range imaging device and converted to low dynamic range in accordance with an embodiment of the disclosure.
Figure 5B:
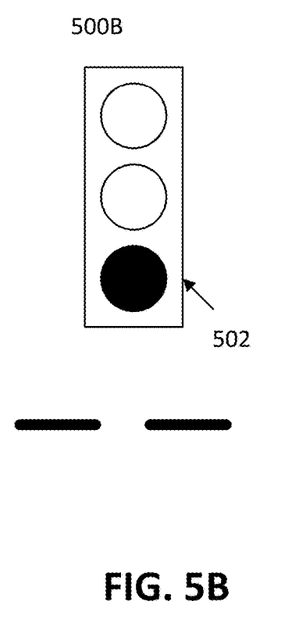
Figure 5C:
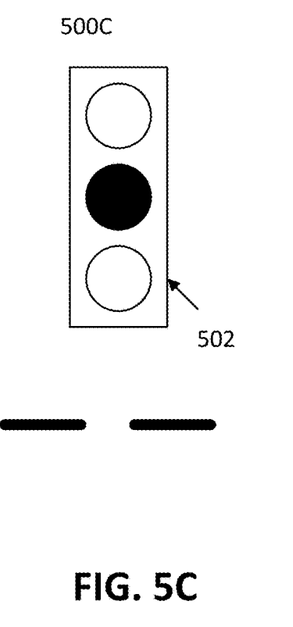

Portions or all of one or more of scenes 500A-C of FIGS. 5A-C may be captured by the camera and may be a first sequence of frames. The first sequence of frames may image one, some, or all of scenes 500A-C. A first transfer function may be determined for the first sequence of frames. The first transfer function may be determined before, during, and/or after the first sequence of frames has been imaged.

In scenes 500A-C, a camera may image a street intersection with a traffic light. In scene 500A, the red light of the traffic light may be illuminated. The camera may, at least, record video of at least a portion of scene 500A to, for example, detect whether a vehicle has run the red light. Scenes 500B and 500C may illustrate when the traffic light has turned green and yellow.

In certain embodiments, the camera may also image scene 500B and 500C, but other embodiments may not image scene 500B and 500C. HDR image frames imaging scenes 500A-C may be down-sampled with the first transfer function. The HDR image frames may be down-sampled after the HDR image frames are captured, whether individually (e.g., down-sampled as soon as the image frames are available) or as a batch. In certain embodiments, data from one or more of scenes 500A-C may be used in determining and/or selecting the second transfer function.

Figure 5D:
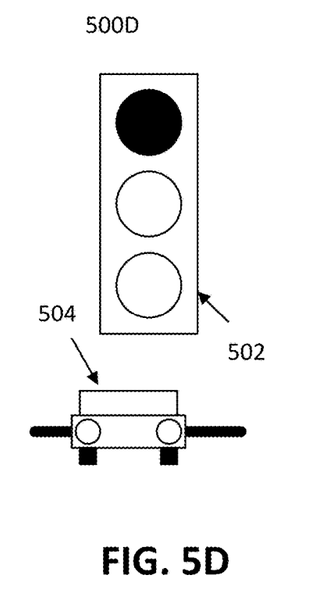
Figure 5E:
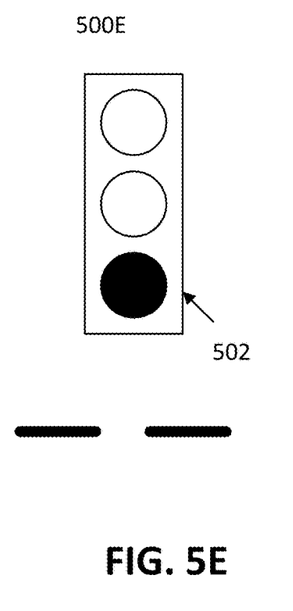
Figure 5F:
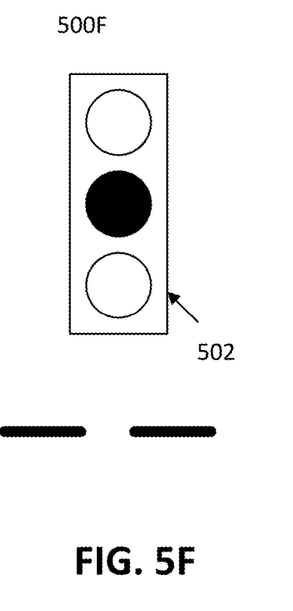

Portions or all of one or more of scenes 500D-F may also be imaged by the camera. The image frames capturing one or more of scenes 500D-F may be HDR image frames. A second transfer function may be created and/or selected for converting the HDR image frames captured by the camera during the second sequence of frames to LDR image frames. In certain embodiments, the second transfer function may be adjusted and/or different from the first transfer function.

For example, in FIGS. 5A-F, the first and second transfer functions may be created and/or selected after the scenes have been imaged. As such, there may, for example, be initial processing of the images before the first and second transfer functions are selected and/or created (e.g., filtering of the images). Accordingly, as scenes 500A-C do not include any detected objects, a first transfer function may be selected for the first sequence of frames that may include a lower count of pixel values as scenes 500A-C may have a lower count of pixel values. However, in scene 500D, a vehicle 504 may be detected within the intersection. One or more HDR image frames of the second sequence of frames may thus image the vehicle 504. The vehicle 504 may include headlights and the headlights may be illuminated. As such, the second transfer function of the second sequence of frames may include a higher count of HDR image frames due to the heat and/or light generated by the vehicle 504 and/or the headlights of the vehicle 504 and/or may allow for better resolution in the LDR image frames around the pixel values of the vehicle 504 and/or the headlights. Such a second transfer function may allow for more accurate determination of when the vehicle 504 enters the intersection and so more accurate determination of whether the vehicle 504 has run a red light.

While the example illustrated above selects the first and second transfer functions after the image frames have been captured, other examples may select and/or determine the first and second transfer functions before and/or as the sequences of frames are being captured by the camera (e.g., detection of a vehicle in an area sequence of frames may lead to adjustment of a transfer function of a later sequence of frames to more accurately image such a vehicle in the later sequence of frames).

Figure 6:
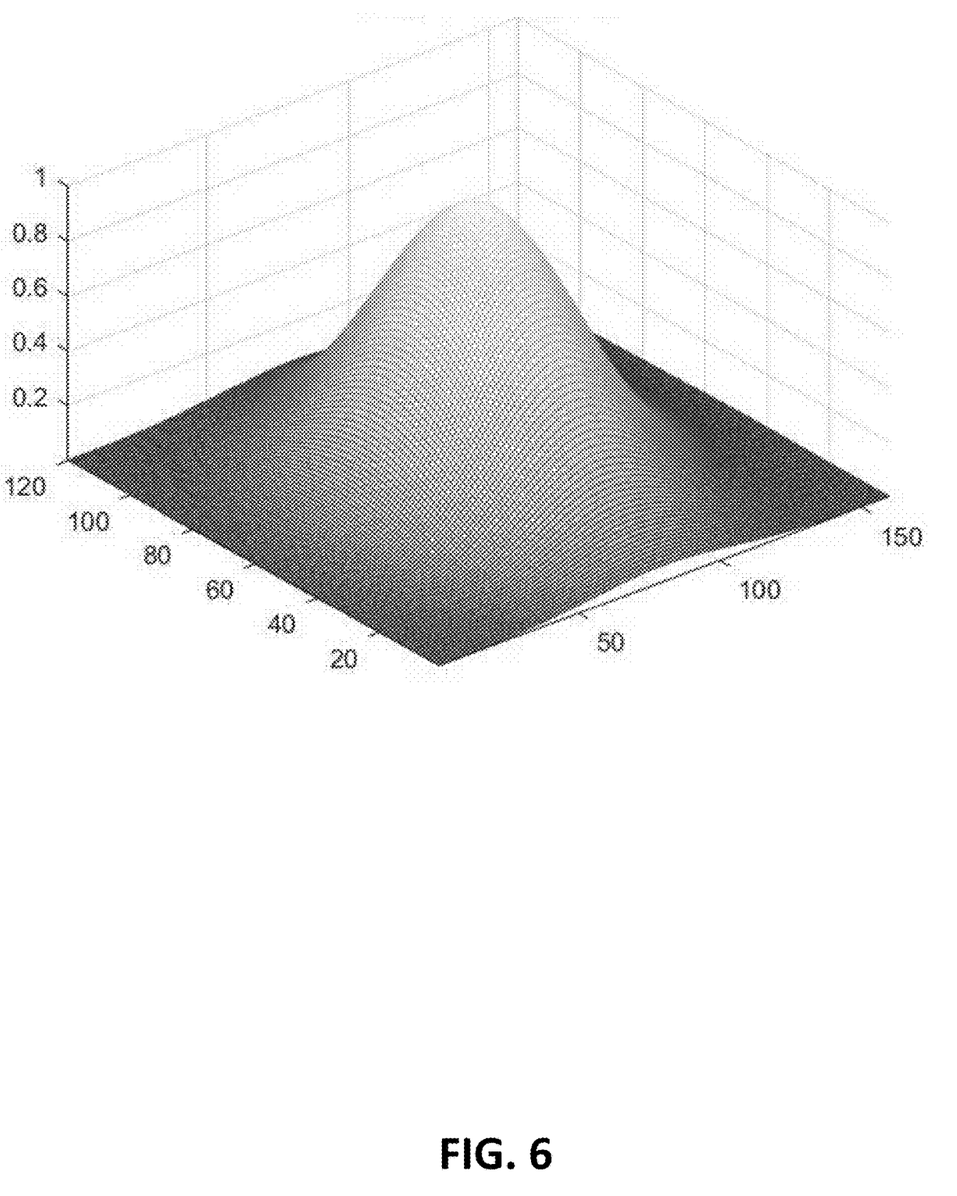
FIG. 6 illustrates a high dynamic range to low dynamic range transfer function in accordance with an embodiment of the disclosure.

FIG. 6 illustrates a high dynamic range to low dynamic range transfer function in accordance with an embodiment of the disclosure. In FIG. 6, the z-axis depicts a HDR to LDR gain. A gain value of 1 may correlate to a one-to-one transfer between HDR and LDR values. The other two axes represent pixel position.

In FIG. 6, a weighting function is depicted. This weighting function may be used when calculating the metrics for each value or range of values of the vector/histogram. Using this weighting function will increase the value for the vector indices associated with values common in the center region of the image. If the transfer function slope/gain is proportional to this calculated weighted sum, objects near the center of the image may have less dynamic range compression and the reconstructed image may more closely reconstruct the HDR value to that of the original HDR value for this region.

Figure 7A:
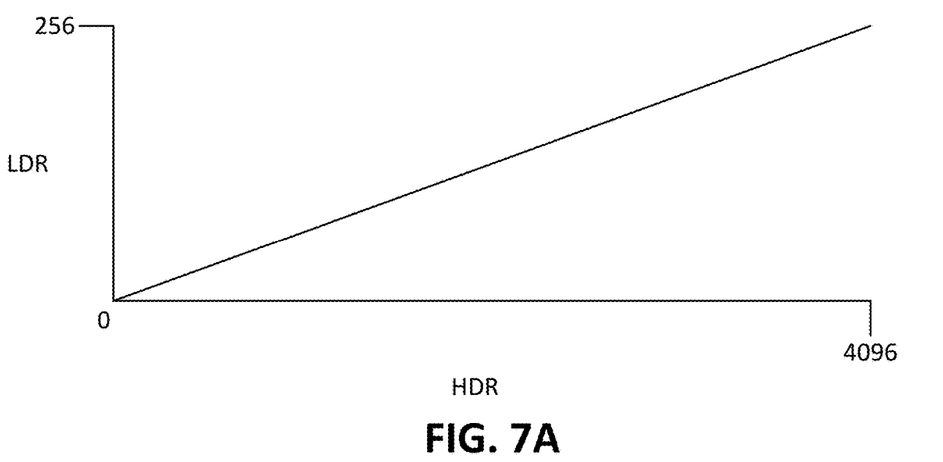
FIGS. 7A-C illustrate additional high dynamic range to low dynamic range transfer functions in accordance with an embodiment of the disclosure.
Figure 7B:
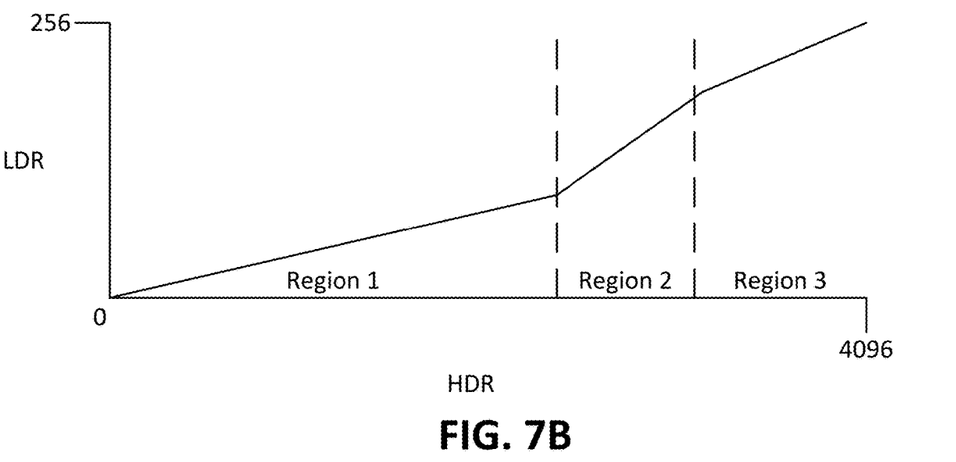
Figure 7C:
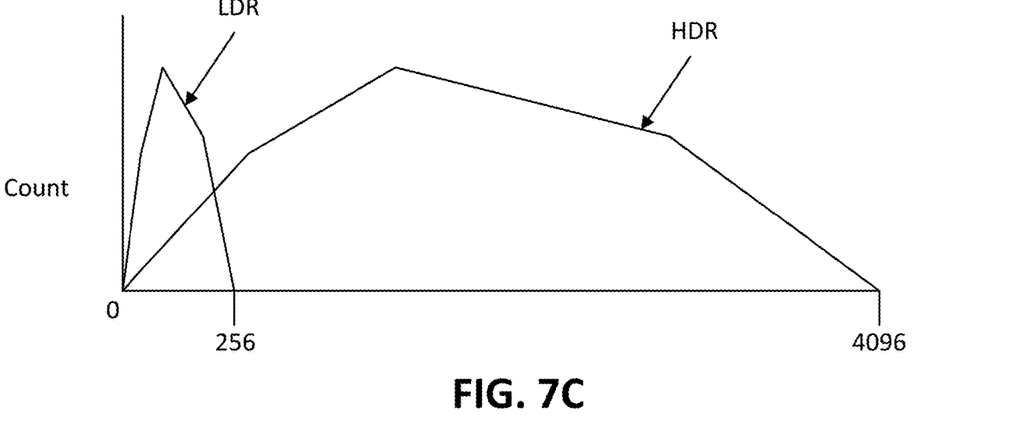

FIGS. 7A-C illustrate additional high dynamic range to low dynamic range transfer functions in accordance with an embodiment of the disclosure. FIG. 7A illustrates a linear transfer function. FIG. 7B illustrates a transfer function with varying HDR to LDR gain/compression. It is appreciated that HDR to LDR gain may be inverse in relationship to HDR to LDR compression. That is, a lower HDR to LDR compression may denote a higher HDR to LDR gain. FIG. 7C illustrates a transfer function based on histogram equalization. The HDR image of FIGS. 7A-C may be a 12 bit image with 4,096 possible image values. The LDR image of FIGS. 7A-C may be an 8 bit image with 256 image values. Note that, while FIGS. 7A-C illustrates a transfer function that may map image values of all possible image values within the HDR and LDR images, other embodiments may map only a portion of the possible image values of the HDR and/or LDR images. It is appreciated that while the gain depicted in FIGS. 7A-C may be shown to be continuous, the gain may actually be piecewise constant. Due to the resolution of FIGS. 7A-C, such piecewise constant gain may be presented by a continuous slope, rather than as individual steps.

In FIGS. 7A and 7B, the x-axis represents HDR image values of an HDR image while the x-axis represents LDR image values of a corresponding LDR version of the HDR image. In FIG. 7A, the HDR to LDR gain is linear across the entire pixel range. That is, the lowest LDR image value may map to the 16 lowest HDR image values, the next lowest LDR image value may map to the next 16 lowest HDR image values, and so on with each LDR image value mapping to 16 HDR image values.

In FIG. 7B, the HDR to LDR gain may vary. Region 1 of FIG. 7B may be a region with a low HDR to LDR gain, while region 2 may be a region with the highest HDR to LDR gain of the three regions in FIG. 7B, and region 3 may be a region with a lower HDR to LDR gain than that of region 2.

In various embodiments, region 2 of FIG. 7B may correspond to image values within a region of interest, such as a hotspot, to image values that may be more important, such as image values that are around that of human irradiance values, image values that are around that of a vehicle, or to image values that would otherwise be advantageous to transfer with higher fidelity/accuracy. The HDR to LDR gain of regions 1 and 3 may be lower than region 2, in order to accommodate the higher resolution of region 2.

FIG. 7C shows a representation of the counts of the image values within a HDR image and the corresponding LDR image. In FIG. 7C, the x-axis may correspond to the range of image values available within the respective images and the y-axis may correspond to the counts of the image values (e.g., the frequency of each image value).

In FIG. 7C, the HDR to LDR transfer function may be created using a histogram. That is, the slope of the transfer function for each HDR image value may be proportional to the amplitude of the histogram for that same HDR value. In FIG. 7C, this may result in the highest frequency/occurrence of image values near the middle of the available image values, while having smaller counts of image values near the extreme ends of the HDR dynamic range. In such a distribution, the relative counts of various image values may be retained during the HDR to LDR transfer.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   receiving a plurality of successively captured high dynamic range (HDR) images, wherein each HDR image comprises a plurality of pixels and each pixel is associated with a HDR image value;
   defining a plurality of successive sequences of the HDR images, each sequence comprising a plurality of successively captured HDR images;
   determining a transfer function for each sequence, wherein the transfer function associates each HDR image value of at least a portion of the HDR image values with a corresponding low dynamic range (LDR) image value;
   for each sequence, converting, with the associated transfer function, each HDR image of the sequence to a corresponding LDR image.

2. The method of claim 1, wherein for each sequence, the transfer function is defined by the HDR images of the sequence; and
   each HDR image is an infrared image.

3. The method of claim 1, further comprising detecting an environmental condition;
   wherein at least one transfer function is determined responsive to the environmental condition.

4. The method of claim 1, wherein at least one transfer function is determined responsive to a time of day.

5. The method of claim 1, wherein each sequence of HDR images comprises HDR images captured during a corresponding event in a sequence of events.

6. The method of claim 5, wherein each image is obtained using a camera, and each event is a dwell point at which the camera images a part of a scene before moving to image another part of the scene.

7. The method of claim 1, wherein for at least one sequence, the transfer function is determined responsive to detecting an object in the images.

8. The method of claim 1, further comprising:
   determining, for at least one transfer function, that at least one of the HDR images comprises an unassociated HDR image value not associated with a LDR image value within the transfer function; and
   updating the transfer function to associate the unassociated HDR image value to a LDR image value.

9. The method of claim 1, further comprising analyzing the LDR images obtained from each sequence of the HDR images to detect an object and its position in multiple LDR images obtained from the sequence.

10. A system for performing the method claim 1, the system comprising:
    a logic device;
    a memory configured to store instructions comprising the method of claim 1 for communication to and execution by the logic device; and
    a camera configured to capture and output the image data comprising the HDR images defined in each sequence of the HDR images to the logic device.

11. A system comprising a logic device associated with a camera, the logic device configured to:
    receive a plurality of successively captured high dynamic range (HDR) images, wherein each HDR image comprises a plurality of pixels and each pixel is associated with a HDR image value;
    define a plurality of successive sequences of the HDR images, each sequence comprising a plurality of successively captured HDR images;
    determine a transfer function for each sequence, wherein the transfer function associates each HDR image value of at least a portion of the HDR image values with a corresponding LDR image value;
    for each sequence, convert, with the associated transfer function, each HDR image of the sequence to a corresponding low dynamic range (LDR) image.

12. The system of claim 11, wherein the transfer function is defined by the HDR images of the sequence; and
    each HDR image is an infrared image.

13. The system of claim 11, further comprising:
    determining, for at least one transfer function, that at least one of the HDR images comprises an unassociated HDR image value not associated with a LDR image value within the transfer function; and
    updating the transfer function to associate the unassociated HDR image value to a LDR image value.

14. The system of claim 11, wherein at least one transfer function is determined responsive to a time of day.

15. The system of claim 11, wherein each sequence of HDR images comprises HDR images captured during a corresponding event in a sequence of events.

16. The system of claim 15, wherein each image is obtained using a camera, and each event is a dwell point at which the camera images a part of a scene before moving to image another part of the scene.

17. The system of claim 11, wherein for at least one sequence, the transfer function is determined responsive to detecting an object in the images.

18. The system of claim 17, wherein determining the transfer function for each sequence comprises selecting one of a plurality of pre-determined transfer functions for each sequence.

19. The system of claim 11, further comprising a sensor for detecting an environmental condition, wherein the logic device is further configured to detect at least one transfer function responsively to the environmental condition.

20. The system of claim 11, wherein the logic device is further configured to analyze the LDR images obtained from each sequence of the HDR images to detect an object and its position in multiple LDR images obtained from the sequence.

\* \* \* \* \*